United States Patent [19]
Bregler

[11] Patent Number: 5,880,788
[45] Date of Patent: Mar. 9, 1999

[54] AUTOMATED SYNCHRONIZATION OF VIDEO IMAGE SEQUENCES TO NEW SOUNDTRACKS

[75] Inventor: Christoph Bregler, Berkely, Calif.

[73] Assignee: Interval Research Corporation, Palo Alto, Calif.

[21] Appl. No.: 620,949

[22] Filed: Mar. 25, 1996

[51] Int. Cl.⁶ .................................................. H04N 9/475

[52] U.S. Cl. .......................... 348/515; 348/576; 345/302; 345/473; 352/87; 386/52; 704/235

[58] Field of Search ..................................... 348/515, 512, 348/518, 571, 96, 97, 14, 576; 345/302, 473, 474; 386/66, 52; 352/87; 704/231, 232, 235, 246, 247, 258, 259, 260, 270; 707/512; H04N 9/475

[56] References Cited

U.S. PATENT DOCUMENTS

| | | |
|---|---|---|
| 4,260,229 | 4/1981 | Bloomstein . |
| 4,827,532 | 5/1989 | Bloomstein . |
| 4,841,575 | 6/1989 | Welsh et al. . |
| 4,913,539 | 4/1990 | Lewis ......................................... 352/87 |
| 5,025,394 | 6/1991 | Parke . |
| 5,040,081 | 8/1991 | McCutchen ................................ 386/66 |
| 5,430,835 | 7/1995 | Williams et al. ........................ 345/302 |
| 5,572,261 | 11/1996 | Cooper ...................................... 348/512 |
| 5,608,839 | 3/1997 | Chen ...................................... 395/2.44 |

FOREIGN PATENT DOCUMENTS

| | | |
|---|---|---|
| 0179701A1 | 4/1986 | European Pat. Off. . |
| 0673107A2 | 9/1995 | European Pat. Off. . |
| 0674315A1 | 9/1995 | European Pat. Off. . |
| 0689362A2 | 12/1995 | European Pat. Off. . |
| 06162166 | 6/1994 | Japan . |
| 2 231 246 | 11/1990 | United Kingdom . |
| WO97/15926 | 5/1997 | WIPO . |

OTHER PUBLICATIONS

Chen, Tsuhan et al, "Lip synchronization in talking head video utilizing speech information", SPIE vol. 2501, Jul. 1995, pp. 1690–1701.

Rabiner, Lawrence R., A Tutorial on Hidden Markov Models and Selected Applications in Speech Recognition, Proceedings of the IEEE, vol. 77, No. 2, Feb. 1989. pp. 257–285.

Covell, M., et al, "Spanning the Gap Between Motion Estimation and Morphing", pp. V–213–V–216, 1994.

Henton, Caroline, et al, "Saying And Seeing It With Feeling: Techniques For Synthesizing Visible, Emotional Speech".

Scott, K.C., et al, "Synthesis of Speaker Facial Movement to Match Selected Speech Sequences", Speech Science and Technology '94, Dec. 5–8, Perth, Australia.

Primary Examiner—Michael Lee
Attorney, Agent, or Firm—Burns, Doane, Swecker & Mathis, L.L.P.

[57] ABSTRACT

The synchronization of an existing video to a new soundtrack is carried out through the phonetic analysis of the original soundtrack and the new soundtrack. Individual speech sounds, such as phones, are identified in the soundtrack for the original video recording, and the images corresponding thereto are stored. The new soundtrack is similarly analyzed to identify individual speech sounds, which are used to select the stored images and create a new video sequence. The sequence of images are then smoothly fitted to one another, to provide a video stream that is synchronized to the new soundtrack. This approach permits a given video sequence to be synchronized to any arbitrary utterance. Furthermore, the matching of the video images to the new speech sounds can be carried out in a highly automated manner, thereby reducing required manual effort.

39 Claims, 9 Drawing Sheets

AUTOMATED SYNCHRONIZATION OF VIDEO IMAGE SEQUENCES TO NEW SOUNDTRACKS

FIELD OF THE INVENTION

The present invention is directed to the synchronization of video image sequences with speech soundtracks, and more particularly to a system that provides a realistic video presentation of a natural human uttering any arbitrary sentence or other sequence of sounds.

BACKGROUND OF THE INVENTION

There are various situations in which it is desirable to have a video recording of a speaking person accurately track words which are different from those which were uttered during the original recording of the video image. One such application is the field of audio dubbing, in which the originally recorded soundtrack is replaced with a different soundtrack. In a simple case, after recording an image of an actor speaking a statement, it may be desirable to re-record the statement, for example to change emphasis or provide a different accent. Rather than recording the entire video sequence again, the redubbing process permits the actor to repeat the statement, with the desired modifications, and substitute the repeated statement for the originally recorded one.

In a more sophisticated video production, it may be desirable to utilize stock footage of an actor and replace the actor's spoken words with an entirely different speech soundtrack, perhaps in a different voice. For example, the original statement might be presented in a different language, or various special effects can be created, such as a child giving a speech in the original voice of a famous statesman.

In these types of applications, the original recorded image must be modified so that the speaker's lip movements are synchronized to the new soundtrack. In the past, the methods for achieving such synchronization have required extensive manual input and/or specialized processing that limited their applicability. One example of a prior art approach, which is based on image alignment, is described in U.S. Pat. No. 4,827,532. That patent is particularly directed to the replacement of a soundtrack in one language with a new soundtrack in a second language, which requires different lip movements for the speaker. In the technique disclosed in the '532 patent, a video recording is made of a new actor speaking the statements in the new language. Special markers are required to define the outlines of the actor's lips in the newly recorded image of the actor speaking in the new language, and the original video must be manually marked. Once the corresponding portions of the old and new video images have been identified, pixels of the original movie frame are modified to make them look like the original actor spoke the words of the new soundtrack.

The procedure disclosed in the '532 patent involves two types of video modification. First, the video sequence is temporally warped, in an effort to align the frames of the original image with the new sounds, so that the lip shapes match one another. Thereafter, visual warping, e.g., morphing, of the image is carried out to transition between non-continuous portions of the video that may result from skipping frames.

Both of these warping steps require a significant amount of manual input. As a result, lengthy video sequences with language dubbing are not easily produced. Furthermore, it is not possible in all cases to temporally warp a video sequence in such a way that the new lip shapes match the original shapes. For example, the image for a closed-lip sound cannot be warped into one for an open-lipped sound, because the teeth and/or tongue would be missing. A similar problem occurs for sounds which are produced with different lip protrusions. Thus, the types of changes which can be effected are limited. In addition, the new soundtrack requires a second video recording, so that the two recorded sequences can be visually aligned. As such, the procedure cannot be used with any arbitrary utterance as the new soundtrack. Rather, only soundtracks which have accompanying video images can be employed.

Other approaches have been used in the field of animation, so that a character's mouth accurately tracks spoken words. However, the images that are used in these approaches are synthetic, and their associated synchronization techniques are not suited for use with video images of a natural person's face.

Accordingly, it is desirable to provide a technique which permits any given sound utterance to be substituted for the soundtrack of a previously recorded video sequence, without requiring a video recording of the new sounds being uttered. It is further desirable to provide such a method which readily lends itself to automation, to thereby minimize the amount of manual input that is required.

SUMMARY OF THE INVENTION

In accordance with the present invention, these objectives are achieved through the modification of frames of an existing video recording to create a new video stream which matches any arbitrary utterance, using a combination of speech recognition techniques and image processing. One embodiment of the synchronization process involves three major steps. First, a video recording is analyzed and all possible lip movements are defined and stored in a database. In practice, it may be necessary to store only a limited number of different visual image sequences in the database, to approximate the visual aspect of all spoken sounds. The visual image sequences are analyzed to identify salient features, and the information stored in the database is annotated with these features. As a second step, a new soundtrack is phonetically transcribed, and an image sequence for each transcribed sound is retrieved from the database. As a final step, the retrieved image sequences are fitted smoothly together using the annotated information, to present a modified video stream that is synchronized to the new soundtrack.

In a related application of this procedure, the new soundtrack comprises the same sentences as those spoken in the original video recording. However, the new sentences may provide a different emphasis, accent, voice, gender or age. The video images are temporally matched to the new audio track through appropriate time warping, to synchronize the video to the new audio message.

In general, therefore, the present invention involves the analysis of a video recording to associate recorded sounds with corresponding images, and the subsequent matching of images from the original video recording to the phonetic components of the new sound. This technique permits a given video recording to be synchronized to any arbitrary audio track, without requiring a separate video recording of the new soundtrack or generation of any artificial speech or graphics. The matching of the video sequence to the new sounds is carried out in a highly automated manner, thereby reducing the amount of manual effort that is required for audio dubbing and the like.

Further features of the invention, and the advantages attained thereby, are explained in detail hereinafter with reference to specific examples illustrated in the accompanying drawings.

DETAILED DESCRIPTION

To facilitate an understanding of the present invention, it is described hereinafter with reference to specific examples in which the soundtrack for a video recording of a person uttering a sound is replaced with a different soundtrack. The examples are related to the replacement of one set of spoken words, e.g. a sentence, with another set of spoken words. However, the practical applications of the invention are not limited to words. Rather, its principles can be applied to other sounds as well, for example singing and non-speech utterances such as laughs, coughs, etc. Therefore, in the context of the present invention, the term "utterance" is employed in a generic sense to refer to spoken words, notes that are sung, and any other sounds which are orally produced and capable of classification using speech-related descriptions.

In setting forth the following examples of the invention, certain specific techniques are identified for various types of video and audio analysis. It will be appreciated, however, that these techniques are exemplary, and that the invention can be practiced using other techniques which provide similar results. Furthermore, it will be understood that the principles of the invention are not limited to the specific illustrative implementations described herein. Rather, there are a number of practical applications of the invention, as discussed in greater detail at the conclusion of the specification.

Figure 1:
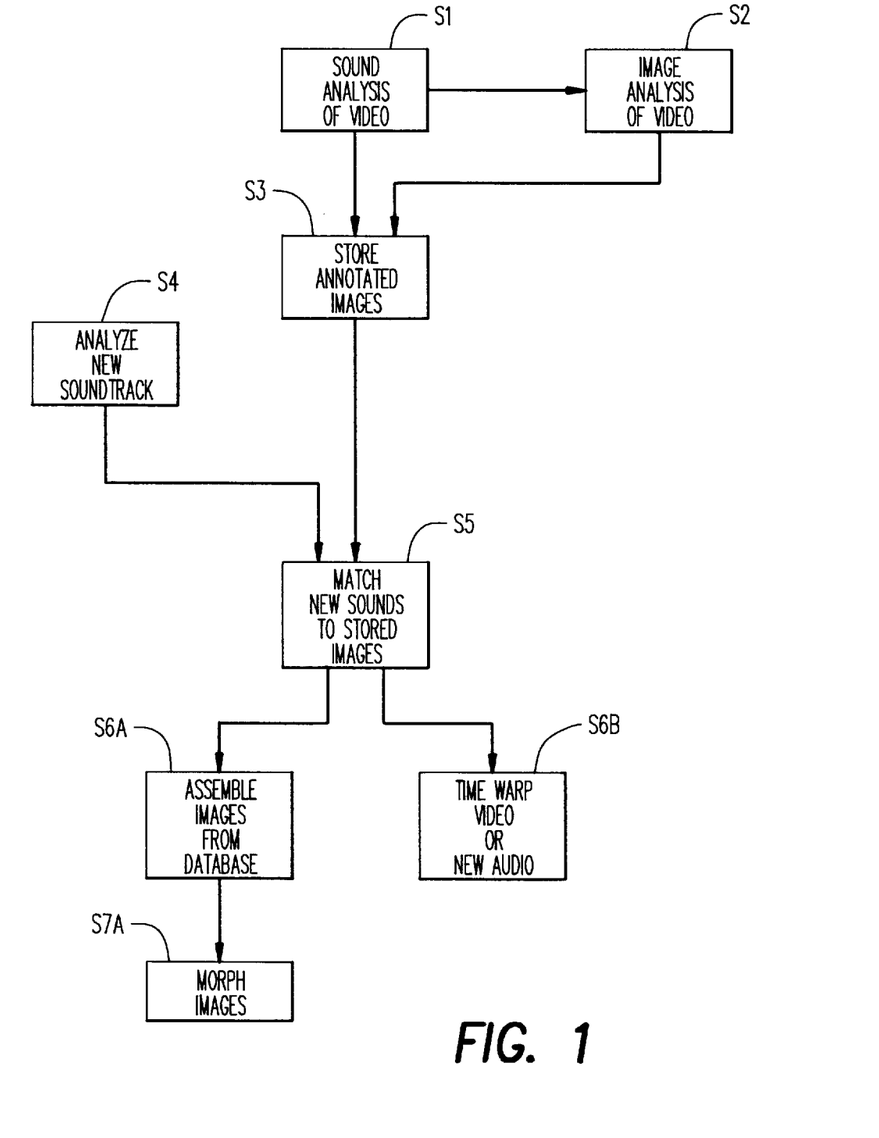
FIG. 1 is a flow diagram of the overall process of the present invention.

An overview of the procedure which is employed in one embodiment of the present invention to synchronize a stock video recording to a new soundtrack is illustrated in the flow diagram of FIG. 1. Referring thereto, a video recording of a natural person who is speaking or singing is analyzed at Step S1, to associate characteristic sounds in the utterance with specific video image sequences. An image sequence that is identified as being associated with a given sound is analyzed at Step S2 to locate salient features therein. For example, control points which identify the position of the speaker's lips can be established within each frame of the sequence. The analyzed video image sequences are stored in a database at Step S3, which is indexed according to the characteristic sounds associated with each image sequence. The stored image sequences are annotated with the control points or other salient features determined in the image analysis step. Thereafter, at Step S4, a new sound utterance, such as the voice of a different speaker, is analyzed to identify the characteristic sounds therein. At Step S5, identified sounds in the new soundtrack are matched with the corresponding images of the original recording. In one embodiment of the invention, an appropriate image sequence is retrieved from the database for each identified sound in the new soundtrack, and all of the retrieved image sequences are strung together at Step S6A. The sequence of images is then smoothed at Step S7A, for example by means of a morphing process which utilizes the established control points, to produce a video stream of the person speaking the new utterance. In an alternate embodiment of the invention in which the new soundtrack is close to that of the original recording, e.g. the same sentence is spoken, at Step S6B the matching is achieved by temporally warping the original video or the new audio, as appropriate, to align the characteristic sounds of the original recording with those of the new soundtrack.

Figure 2:
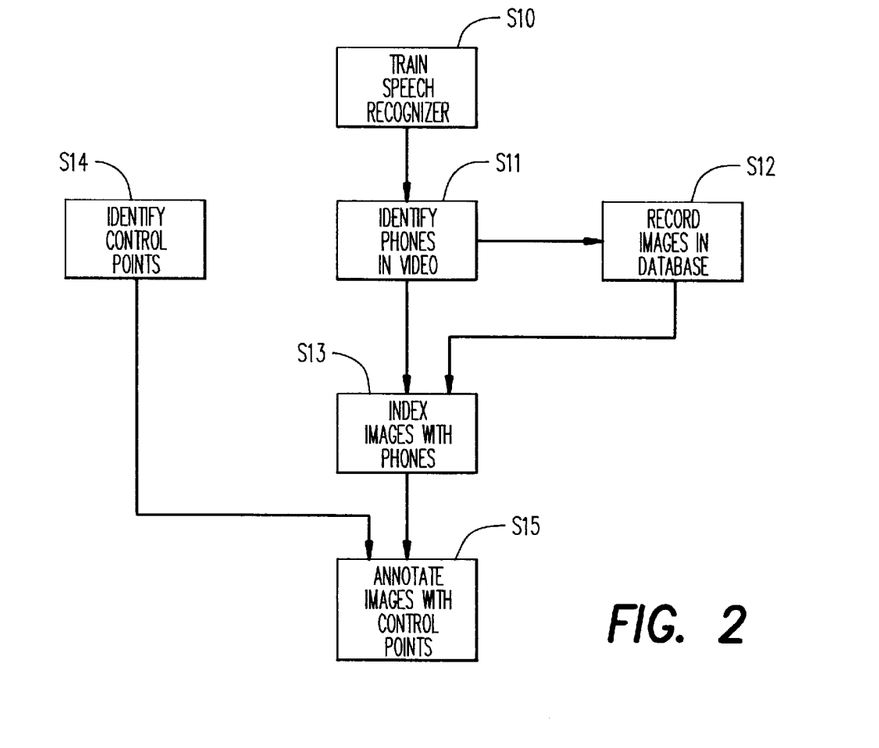
FIG. 2 is a more detailed flow diagram of the procedure for creating an annotated database of sound-related image sequences.

The creation of a database of sound-indexed and annotated images at Steps S1–S3 of FIG. 1 is illustrated in greater detail in the flow diagram of FIG. 2. Basically, a video recording, with its accompanying audio track, first undergoes a speech recognition procedure. The purpose of this procedure is to identify recognizable components, or features, which make up the recorded utterance. In one embodiment, these components comprise the individual phones of speech, i.e. a set of the smallest units of speech. More preferably, individual diphones or triphones of speech are utilized, since they include sufficient context and better model acoustic and visual transitions. As used in the context of the present invention, the term "phone" is intended to refer to diphones and triphones, as well as individual phones of speech. Different words or different pronunciations of the same word can be generated by stringing together these phonetic units, with the use of conventional pronunciation dictionaries. A variety of acoustic features, such as MFCC, RASTA-PLP and LPC can be used to classify the different units of speech.

Various types of speech recognition devices are well known in the art, and can be employed to identify the component sounds of the recorded speech. For example, a neural network can be trained to operate as an automatic speech recognition device. In a preferred embodiment of the invention, a Hidden Markov Model (HMM) system is employed as a phonetic speech recognizer. A description of the use of an HMM system for such a purpose is described in Rabiner, Laurence R., "A Tutorial on Hidden Markov Models and Selected Applications in Speech Recognition", Proceedings of the IEEE, Vol. 77, No. 2, pp. 257–286, February 1989, the disclosure of which is incorporated herein by reference.

Referring to FIG. 2, at Step S10 the speech recognizer is first trained to recognize the sound components which are to be employed for classification purposes. For example, an HMM system can be trained to recognize phones by means of a training device such as the Hidden Markov Toolkit from Entropic Research Lab. If the same person's voice is to be employed in both the original video sequence and the new audio track, the HMM system can be trained on only that person's voice. Alternatively, one speaker-dependent HMM system can be used for the original soundtrack, and a different speaker-dependent system can be employed to analyze the new sound utterance, if sufficient training data is available for each speaker. More preferably, however, the speech recognizer is trained to be speaker independent, so that any arbitrary spoken utterance can be substituted for any original soundtrack. This approach is particularly desirable for those situations in which the original soundtrack is short, and very little training data is available for the speaker.

To avoid adverse results from the respective characteristics of different microphones used in the original and new soundtracks, a channel-invariant acoustic feature extraction system is preferably employed to provide the input information to the HMM system. One example of such a system is the RASTA-PLP system described in Hermansky et al., "Compensation for the Effect of the Communication Channel in Auditory", Proc. Europ. Conf. on Speech Comm. and Tech., 1991, pp. 1367–1370, and in U.S. Pat. No. 5,450,522, the disclosures of which are incorporated herein by reference. Other approaches to channel invariance can also be employed.

Figure 3:
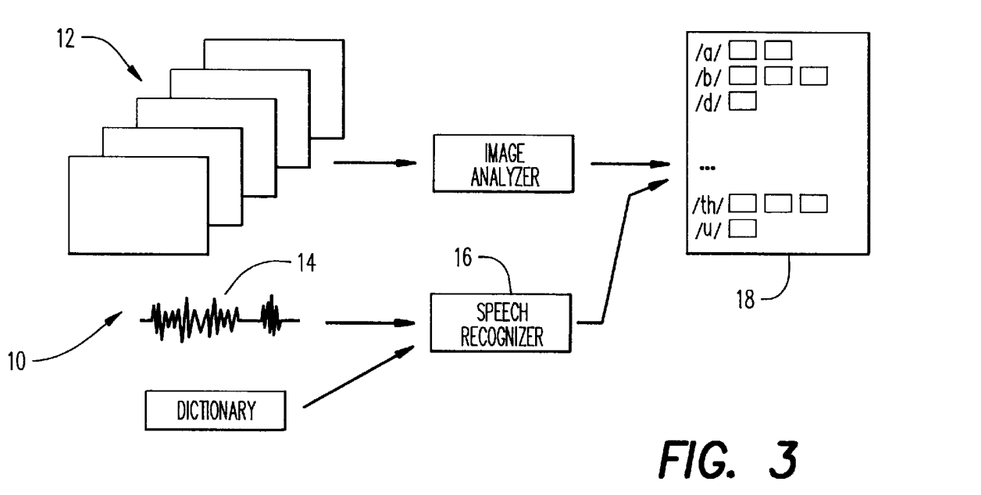
FIG. 3 is a schematic functional illustration of the process for creating a viseme database from a video recording.

After the speech recognizer has been trained to identify individual phones in a spoken utterance, it is used to analyze the particular soundtrack that accompanies the video recording of interest and construct a database of relevant image sequences. The procedure for generating the database of image sequences is schematically depicted in FIG. 3. Referring thereto, a stock video recording 10 comprises a series of image frames 12 and an accompanying audio track 14. The stock video is played back, and the recorded sounds are analyzed in a speech recognizer 16, which identifies individual phones in the recorded speech (Step S11 in FIG. 2). For each phone which is recognized in the recorded soundtrack, video image data corresponding to the identified sound is recorded in a database 18 (Step S12). The stored video image data could comprise a single image, e.g. one video frame, for each phone. For better results, a sequence of images is stored, e.g. 1–11 frames, depending on the duration of the phone, to encompass the full pronunciation of the phone. The recorded image data is indexed in the database 18 in accordance with the particular phone with which it is associated (Step S13).

Each frame or sequence of frames stored in the database also undergoes image analysis at Step S14, to locate salient information in the stock video that can be subsequently used to construct a new video presentation. For example, as described in greater detail hereinafter, the image can be analyzed to locate control points, which identify the location and orientation of the speaker's lips within each frame. Once these features have been identified, they are stored in the database along with the images, at Step S15. The completed database 18 contains a video image sequence of the speaker's lip position that corresponds to each spoken sound that was recorded, annotated with the relevant control points or other feature information.

According to one established standard for speech recognition, known as the TIMIT phone set, there are sixty-one different phone categories which characterize human speech. Basically, each phone represents a different sound that can be uttered by a person. However, different phones may have the same visual appearance to a viewer. For example, a speaker's lips are in the same position to pronounce the sounds for each of the letters "b" and "p". Similarly, the pronunciation of the sounds associated with the consonants "d" and "t" present the same visual impression. In the context of the present invention, the visual appearance of a spoken phone is identified as a "viseme." The sixty-one categories of auditory phones can be mapped to a set of ten visemes. Thus, a compact version of the database need only contain ten entries, respectively associated with the ten visemes. If sounds other than spoken words are also of interest, the TIMIT phone set can be extended to add categories for non-speech utterance, such as coughs, laughs, burps, clicks and the like. In such a case, the set of visemes stored in the database 18 is similarly extended to encompass these additional non-speech categories.

Figure 4A:
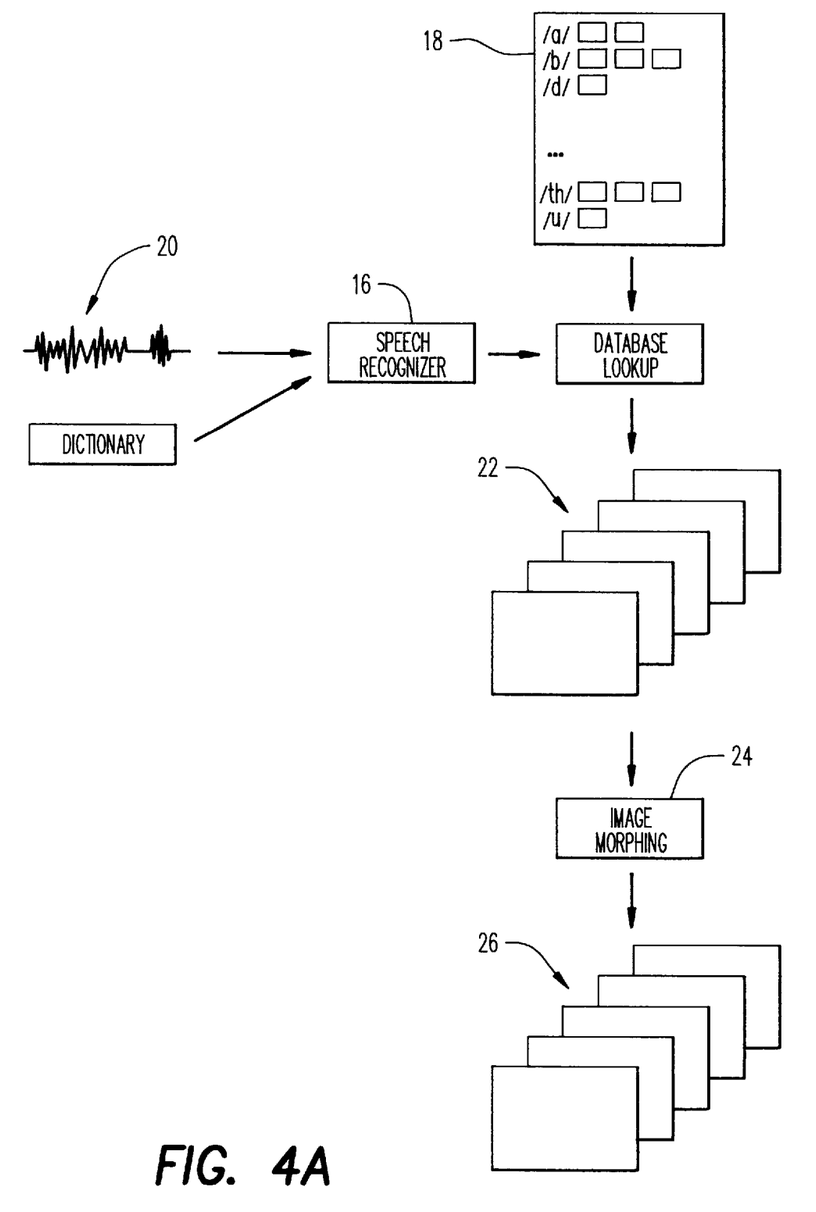
FIG. 4A is a schematic functional illustration of a first embodiment of the process for creating a new video stream that is synchronized to a new audio track.

Once the database 18 has been constructed, it can be used to assemble a video stream that is synchronized to a new utterance. A simple version of this process is conceptually depicted in the schematic illustration of FIG. 4A and the flow diagram of FIG. 4B. Referring thereto, a new soundtrack is provided to the speech recognizer 16. In the illustrated example, the soundtrack is recorded on a suitable medium, such as a magnetic tape 20. In practice, however, the new soundtrack need not be pre-recorded. For example, words uttered by a speaker can be directly fed into the speech recognizer 16 via a microphone, as they are being spoken. The speech recognizer identifies each of the individual sounds in the new utterance, e.g., the successive phones, at Step S20. Each identified sound provides an index that is used to access the database 18 at Step S21. For each such sound, the corresponding video image sequence, e.g., viseme, is selected from the database at Step S22, and the retrieved visemes are assembled into a string 22 of concatenated viseme sequences at Step S23. In the example of FIG. 4A, four selected viseme sequences 22 respectively correspond to four successive phones in the new soundtrack on the magnetic tape 20.

Figure 4B:
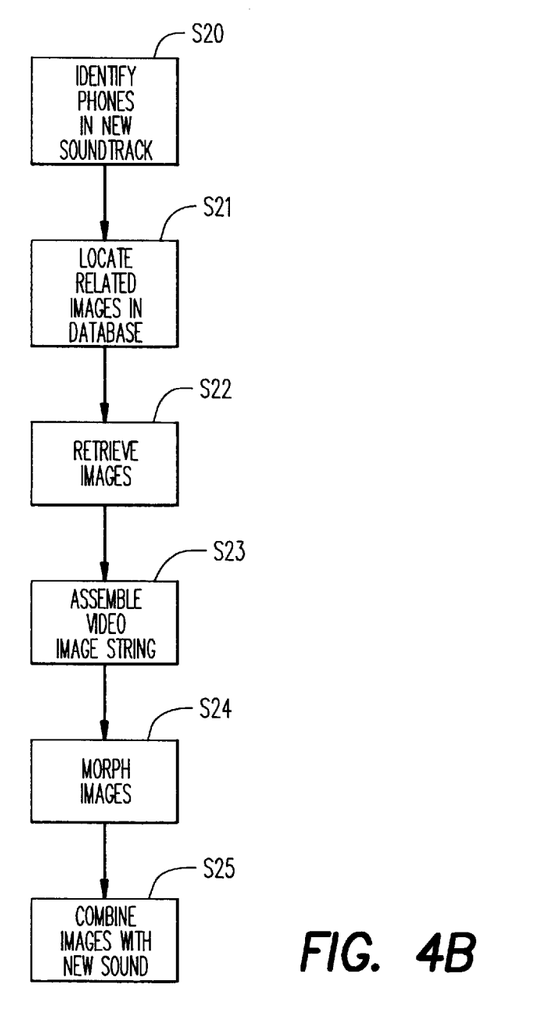
FIG. 4B is a more detailed flow diagram of the procedure for assembling a new video string from the database and a new soundtrack in accordance with the first embodiment of FIG. 4A.

Since adjacent image sequences in the assembled string 22 may relate to non-successive portions of the original video recording, there might be abrupt changes from one image sequence to the next. Accordingly, it is desirable to smoothly fit the sequential images to one another. For this purpose, the sequences of images retrieved from the database 18 are preferably processed in an image morphing device 24 (Step S24). This device essentially functions to morph one image into the next successive image in a conventional manner, using the control features that are stored with the images in the database. As a result, the images smoothly transition from one to another, to more closely resemble the natural movement of the speaker. The smoothly fitted images are then combined with the new soundtrack 20 at Step S25, to produce a new video stream 26 in which the image of the speaker is synchronized with the sounds in the new soundtrack.

In the embodiment of FIG. 4A, the video data that is stored in the database 18 can comprise complete video frames from the original stock recording 10, each of which might include the full head of the speaker. If the spoken material is of any appreciable length, it is quite possible that the speaker's head will move during the recorded session. For non-portrait images, which encompass a larger portion of the speaker's body, the possibility of movement is even greater. Because of these movements in the original recording, when the various frames are reassembled to create the new sequence 22, jerky movements of the speaker's head or body may result. Similarly, if the speaker presents exaggerated expressions, e.g., raised eyebrows, unnatural movements may appear in the reconstructed sequence 22. To limit the possibility of such, rather than storing and using complete video frames to generate the new sequence 22, it is sometimes preferable to employ subimages which contain only those portions of a video frame that are necessary to achieve synchronization with the new utterance. The subimage therefore might comprise the lips of the speaker, and perhaps a small area surrounding the mouth. Since the jaw of a person typically moves in concert with the lower lip during speech, it is preferable to include the jaw in the subimage as well.

Figure 5A:
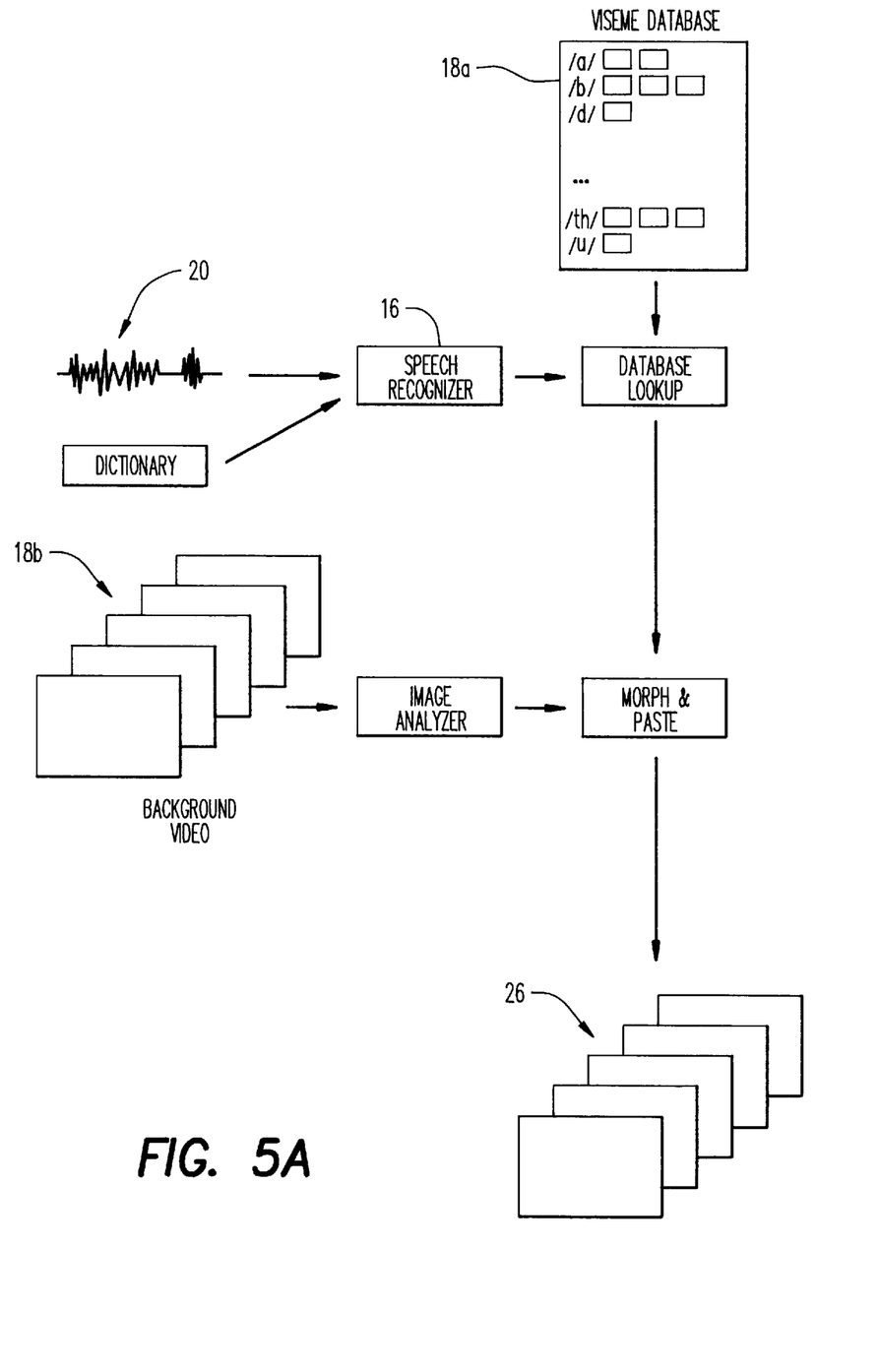
FIG. 5A is a schematic functional illustration of a second embodiment for creating a new video stream.
Figure 5B:
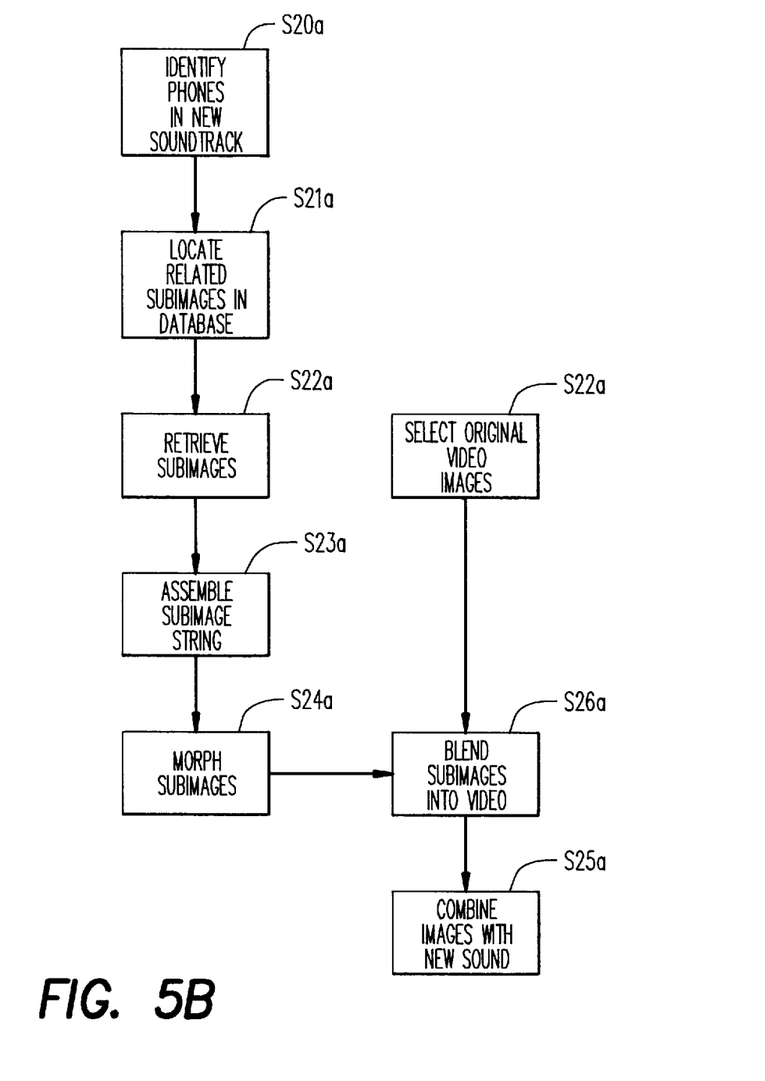
FIG. 5B is a flow diagram of the process carried out in the second embodiment of FIG. 5A.

An embodiment of the invention which employs subimages is depicted in FIGS. 5A and 5B. In this implementation, the final synchronized video stream 26 is generated by "pasting" or blending each retrieved sequence of subimages into a full image of the speaker's head. In one embodiment, the successive subimages can be pasted onto a still-frame image of the speaker. For a more naturally appearing presentation, the subimages are incorporated into a running presentation of the speaker. For this purpose, the database 18 is composed of two parts 18a and 18b. Subimages which correspond to the individual visemes are stored in one portion 18a of the database. Each stored subimage is indexed according to its associated viseme, and annotated with relevant features determined through image analysis, as in the previous embodiment. The second portion 18b of the database contains full-frame images 12 of the original stock video 10. In operation, subimages retrieved from the database 18a are pasted into full-frame images retrieved from the database 18b to produce the final video sequence.

To ensure the correct placement of the subimages within the video frames, the frames stored in the database 18b are annotated with control points that correspond with those in the stored subimages. For example, a single control point might be located at the center of the top edge of the speaker's upper lip. This control point is identified in the original recording stored in the database 18b, and in each of the subimages stored in the database 18a. In operation, subimages are retrieved from the database 18a to form a concatenated viseme sequence 22, as in the embodiment of FIG. 4A. The subimages are then morphed to one another, at Step 24a, to provide a smoothed presentation. One example of a morphing technique that is suitable for this purpose is described in "Feature-based Image Metamorphosis" by T. Beier and S. Neely, *Computer Graphics* 26, 2 (1992), pp.35–42, the disclosure of which is incorporated herein by reference. The smoothed sequence of subimages is pasted into a series of successive full-frame images retrieved from the database 18b, at Step 26a. When a subimage is pasted into the original full-frame sequence, the control point of each frame in the subimage sequence is aligned with that of a corresponding frame of the original recording, to ensure that the subimage of the mouth is located at the proper position within the video frame.

Figure 6:
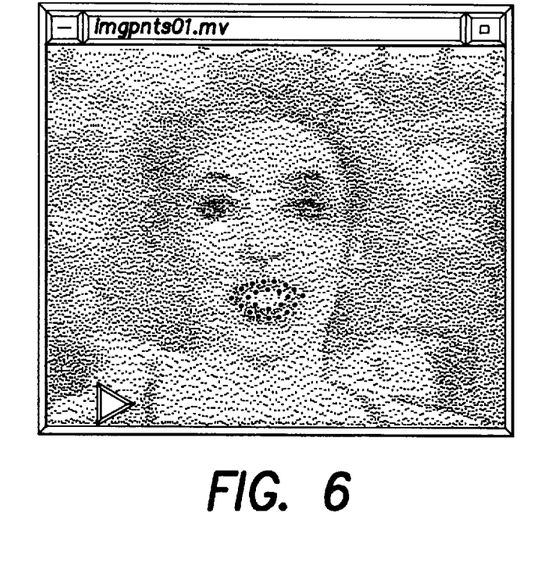
FIG. 6 is an example of a video frame in which control points on a speaker's lips have been marked.

Preferably, a plurality of control points are employed to align the speaker's lips in the subimage and the full frame image. To this end, an automatic visual tracking algorithm is utilized to identify the lip boundaries of the speaker. Conventional contour tracking algorithms can be used to define the outer boundary of the speaker's lips. An example of a suitable contour tracking algorithm is described in Kaas et al., "SNAKES: Active Contour Models", *Proc. of the First Int. Conf. on Computer Vision*, London 1987. If the resolution of the video image is low, a grey level based algorithm can be employed, such as the eigen-images approach described in Pentland et al, "View-Based and Modular Eigenspaces for Face Recognition", *Proceedings of the IEEE Computer Society Conference on Computer Vision and Pattern Recognition*, June 1994, pps. 84–91. Most preferably, the tracking algorithm is one which identifies control points on both the outer and inner boundaries of the speaker's lips. An example of such an algorithm is described in co-pending application Ser. No. 08/651,108. An example of a video image of a speaker, in which the inner and outer lip control points have been automatically identified, is illustrated in FIG. 6. These control points are stored with each subimage recorded in the database 18a, and each full-frame image in the database 18b.

Figure 7:
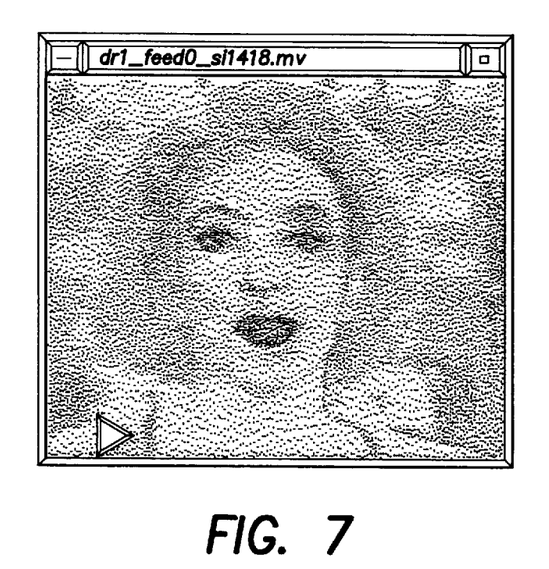
FIG. 7 is an example of the video frame in which a new lip image has been incorporated.

The concatenated and smoothed sequences 22 of the subimages are pasted into the final video stream 26 by means of the pasting process of Step S26a, which utilizes the recorded control points. At a coarse level, the control points are first used to determine the location of the new lip subimages in the video frame, and whether any rotation and scaling needs to be applied to them. After the general location, scaling and orientation of the images are determined, the control points are used to align the subimage with the full-frame image, and fade the new lip images into the frame. This procedure can be carried out using any suitable conventional morphing program. One example of a morphing program that can be used in this context is the public domain software "Morphine". An example of a video frame corresponding to the original image of FIG. 6, but with a new morphed lip subimage, is illustrated in FIG. 7.

The duration of a phone is relatively short, and may encompass only three or four successive frames in the video sequence. In such a case, to achieve a smooth fit of images it may not be necessary to use a morphing process, which comprises both cross-fading and warping of the images. Rather, it may be sufficient to simply cross-fade the images over the course of a few frames, to obtain an acceptable blending of the subimage into the original video recording. For example, after the subimage is suitably scaled and rotated, it is cross-faded into the original recording in such a manner that the position of the speaker's upper lip remains the same in both the original and new images. Further in this regard, it is not necessary to blend the subimages together, prior to pasting them into the full-frame images. Rather, the blending can be inherently implemented as part of the pasting process. In other words, Steps S24a and S26a of FIG. 5B can be carried out in a single procedure.

There are several different approaches that can be used to assemble the database 18 and subsequently retrieve the stored image information to construct the image sequences 22. In the relatively simple embodiment described above, a minimum number of visemes, approximately ten, can be stored in the database. In this embodiment, each identified phone in the new soundtrack is used to select a corresponding viseme from the database, to form the string of image sequences 22. This particular implementation is particularly useful in those situations where a limited amount of data is available, for example where the analyzed portion of the original stock video is relatively short.

In a more complex embodiment, the information stored in the database 18 can comprise bi-visemes. A bi-viseme is the visual image that corresponds to the transition from one phone to the following phone. The bi-visemes are indexed in the database 18 by means of diphones, i.e., temporal phone pairs. In this embodiment, the images are retrieved from the database 18 on the basis of diphones identified in the new soundtrack. For example, the spoken word "bar" consists of a series phones corresponding to the sounds for "b", "ah", and "r", accompanied by silence at the beginning and the end of the word. When this spoken word is analyzed, the speech recognizer 16 produces an output signal for the diphone "sil-b", i.e. silence followed by the sound for the consonant "b". The bi-viseme for this diphone is selected from the database 18. The speech recognizer 16 then produces an output signal for the diphone "b-ah", and the corresponding bi-viseme is retrieved from the database to form the next image sequence in the string 22. The next diphone corresponds to the sound "ah-r", and its corresponding bi-viseme is retrieved from the database, to form the next image sequence in the string 22. Finally, the bi-viseme for the diphone "r-sil", i.e. silence at the end of the word, is selected from the database. If a bi-viseme for a particular diphone is not stored in the database, the corresponding single viseme is selected. Thus, in the foregoing example, if there is no stored bi-viseme for the sound "ah-r", the single viseme for the phone "r" is selected.

In a more sophisticated implementation of this embodiment, several alternative bi-visemes can be selected with the use of dynamic programming techniques. In this implementation, an energy function can be defined which consists of three terms. One term measures the quality of the visual match between successive bi-visemes in the new utterance. This matching might be carried out, for example, by comparing the grayscale values of corresponding pixels in the successive bi-visemes. The second term in the energy function measures the difference between the length of the bi-viseme stored in the database and the corresponding diphone in the new utterance. The third term in the energy function is a penalty value that is assigned in those situations where a single viseme is used instead of a bi-viseme. The energy function is computed for each of the alternative combinations of bi-visemes, and the one which exhibits the minimum energy function is selected for use in the image sequence 22.

In the preceding embodiments of the invention, audio analysis is employed to recognize the phones in the original soundtrack, to identify and store corresponding viseme image sequences. In some cases, the original recording may not readily lend itself to this type of analysis. For example, other sounds may overlay the voice of the speaker of interest, such as when two people speak simultaneously or background music is sufficiently loud to corrupt the input to the speech recognition system. In another example, the time alignment between video and audio tracks may drift, as sometimes happens in digital systems, so that the viseme image sequence at a certain point does not accurately correspond to the detected phone at that point.

In an alternate embodiment of the invention, image analysis is employed to identify the individual visemes, rather than audio analysis. In this embodiment, the control points in each frame, or more preferably a sequence of frames, are provided to any suitable pattern recognition or gesture recognition system, such as a Hidden Markov Model system or a neural network. The system is trained to recognize the spatial distribution and/or relative movement of the lip control points that are associated with different respective visemes, and is not affected by multiple sounds in the original soundtrack or misalignment between the video and audio tracks. In operation, the recognition system generates viseme labels for input image sequences, which are used to store and index those image sequences in the database 18a. Thereafter, the system operates in the same manner as the previously described embodiments.

In the foregoing examples of the invention, a database is constructed of image sequences corresponding to identified sounds, and a new video stream is assembled from the recorded images in accordance with the new soundtrack. If, however, the new soundtrack is substantially similar to the originally recorded sounds, the reconstruction of the video stream may not be necessary. For example, in the production of television advertisements, it is sometimes desirable to have an actor re-record a statement, to delete an unnecessary pause or provide different emphasis. In such a case, the words in the new soundtrack are the same as those of the original recording, but the timing may be different. In this type of situation, the present invention can be employed to modify the originally recorded video, to synchronize it with the re-recorded soundtrack, utilizing time warping techniques.

Figure 8:
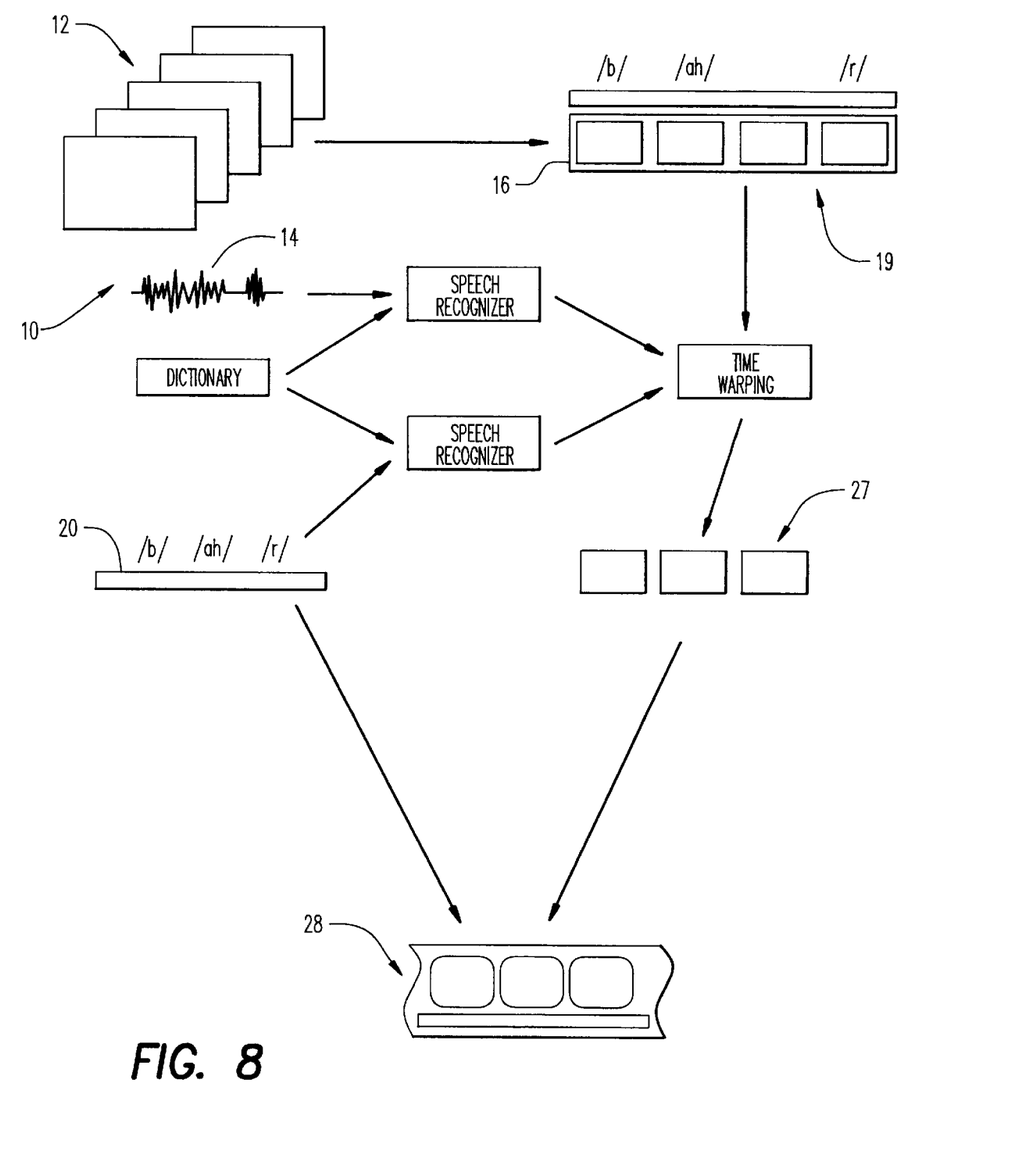
FIG. 8 is a schematic functional illustration of an alternate procedure for synchronizing a video sequence to a new soundtrack.
Figure 9:
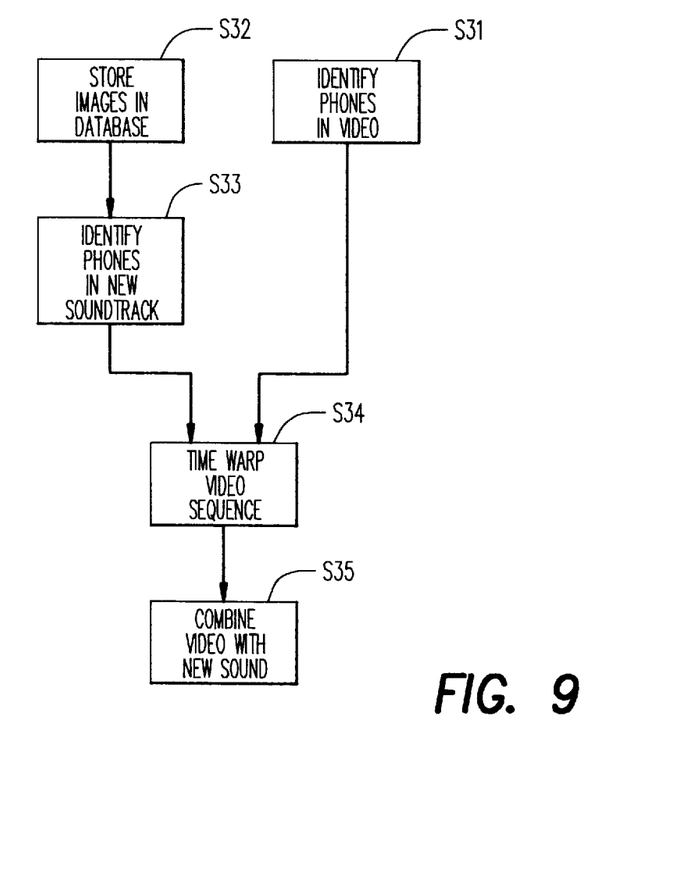
FIG. 9 is a flow diagram of the alternate procedure shown in FIG. 8.

This embodiment of the invention is depicted in the schematic illustration of FIG. 8 and the flow diagram of FIG. 9. Referring thereto, the original recording 10 is analyzed at Step S31 to identify individual phones, or other characteristic components of speech. The particular frames which correspond to the different components are recorded in a database 19 at Step S32. A new sound recording 20 undergoes similar speech analysis at Step S33. It may consist of the same speech components, e.g. phones for the word "bar", but the timing between the individual sounds may be different from the original recording. Once the corresponding speech components have been identified in both the original recording and the new soundtrack, the recording undergoes a time warping process at Step S34, to synchronize it to the new soundtrack. In the example of FIG. 8, a frame is dropped from the original recording, so that the remaining frames in a new video sequence 27 correspond to the timing of the new speech soundtrack 20.

In a situation where one or more frames must be dropped from the video recording, a decision must be made as to which frame(s) to drop. In the context of the present invention, a set of selection rules which are based on the phones associated with the respective frames can aid in this process. Typically, the lip movements associated with consonant sounds are much quicker than those for vowel sounds. For example, the closure of the lips to pronounce the sound for the letter "b" might occur over the course of one or two video frames, whereas the following vowel sound might extend over several frames. In such a case, the predefined set of rules might specify that a frame associated with the closure of the lips and start of the release of the "b" sound is to be selected, and one or more subsequent frames associated with a vowel sound can be dropped. Such an approach maintains the appearance of correct lip motions for the compressed time audio track.

As an alternative to modifying the original video recording, the new speech soundtrack can be time warped, to temporally align it with the original video. Whether the original recorded video or the new soundtrack is temporally warped to align it to the other can be a matter of choice. Generally speaking, however, it is desirable to warp the one which is the slower of the two, to synchronize it with the faster recording. Any suitable time-scale modification technique, such as synchronous overlap-and-add (SOLA), can be employed to temporally warp the audio or video track.

Once the time warping process is complete, the video sequence is combined with the new soundtrack 20 at Step S35, to form a new audio-visual presentation 28. This embodiment of the invention is particularly desirable for those cases in which the words in the two soundtracks are the same as, or substantially the same as, one another, since it does not require lip tracking, control-point designation or viseme alignment. Examples of suitable applications for this embodiment include redubbing of movie soundtracks, and karaoke systems in which a person sings to an accompanying video presentation.

The foregoing aspects of the invention are preferably implemented in a computer system (not shown) which is suitably programmed to perform the functions of speech recognition and image morphing. Since these procedures are conventionally known in themselves, they have not been described in detail herein. The database can be stored in any suitable memory associated with the computer system, e.g. a magnetic hard disk. The original video recording and the new soundtrack can likewise be stored in the computer system. The output video stream that is synchronized to the new soundtrack can be initially stored in the computer's memory, and then transferred to some other medium suitable for playback, e.g. a video tape cassette, or played back directly from the computer.

It will be appreciated by those of ordinary skill in the art that the present invention can be embodied in other specific forms without departing from the spirit or essential characteristics thereof. Specifically, although the embodiments of the invention have been described with reference to their implementation in audio dubbing, the practical uses of the invention are not limited to these types of applications. As one example, the invention can also be employed to provide a low bandwidth video phone. In such a situation, the transmitter only needs to send the audio channel and a viseme sequence. The receiver can utilize the viseme stream, along with previously stored video data, such as full-frame images, to reconstruct a lip-synchronized image of the caller. As another example, the invention can be used to provide new types of user interfaces for computers, in which a well-recognized personality can speak to the computer user with instructions or requests for information. In another embodiment, the invention can be employed to create avatars in virtual reality games, or the like, wherein an image of any given face can speak with the player's voice.

It will be appreciated by those of ordinary skill in the art that the present invention can be embodied in other specific forms without departing from the spirit or essential characteristics thereof. For example, although neural networks and Hidden Markov Model systems have been individually described as suitable implementations for automatic speech recognition, some combination of the two types of systems could be employed for this purpose. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for modifying a video recording having an accompanying audio track to produce a new video presentation with a different audio track, comprising the steps of:

analyzing said accompanying audio track by means of automatic speech recognition techniques to identify video frames in the video recording that are associated with individual speech characteristics in said accompanying audio track, and storing video image information from each of said frames in a database;

analyzing video image information from said frames to identify predetermined features associated with the video image, and annotating the video image information stored in said database with data relating to said features;

analyzing a sound utterance to identify individual speech characteristics in said sound utterance;

selecting video image information stored in said database according to the identified speech characteristics in said sound utterance, and assembling the selected items of image information to form a sequence; and smoothly fitting the selected items of information in said sequence to one another in accordance with the annotated data to produce a video presentation that is synchronized to said sound utterance.

2. The method of claim 1 wherein said individual speech characteristics in said audio track and in said sound utterance include phones.

3. The method of claim 2 wherein said individual speech characteristics comprise diphones.

4. The method of claim 2 wherein said individual speech characteristics comprise triphones.

5. The method of claim 1 wherein said annotated data comprises control points in the video images, and said step of smoothly fitting the items of information in said sequence comprises the process of morphing between pairs of adjacent items of information in the sequence, using said control points.

6. The method of claim 5 wherein said control points identify the location of a speaker's lips in the video images.

7. The method of claim 1 wherein each item of video image information stored in said database is a subimage comprising a portion of an entire image in a video frame.

8. The method of claim 7 further including the step of incorporating the subimages into full video frames to produce said video presentation.

9. The method of claim 1 wherein the video recording includes an image of a person's head, and wherein each item of video image information stored in said database comprises a subimage of an area encompassing the mouth of the person in the image.

10. The method of claim 9 further including the step of incorporating the subimages of a person's mouth into a video frame that includes an image of a person's head.

11. The method of claim 1 wherein the step of analyzing the video recording comprises the step of analyzing said predetermined features to identify individual speech characteristics associated with said features.

12. The method of claim 11 wherein said predetermined features comprise control points which define the shape of a speaker's lips.

13. The method of claim 12 wherein said analysis comprises detection of the relative motion of said control points.

14. The method of claim 12 wherein said analysis comprises detection of the spatial distribution of said control points.

15. A method for synchronizing a video sequence having an accompanying audio track with a different audio track, comprising the steps of:

analyzing the audio track accompanying said video sequence by means of automatic speech recognition techniques to identify individual speech characteristics in said accompanying audio track;

analyzing a sound utterance in said different audio track by means of automatic speech recognition techniques to identify individual speech characteristics in said sound utterance; and temporally modifying said video sequence so that identified individual speech characteristics in said video sequence are temporally aligned with corresponding individual speech characteristics in said sound utterance.

16. The method of claim 15 wherein said modifying step comprises the process of reordering frames of said video sequence to align them with individual speech characteristics in said sound utterance.

17. The method of claim 15 wherein said modifying step comprises the process of altering the timing of frames of said video sequence to align them with individual speech characteristics in said sound utterance.

18. The method of claim 15 wherein said individual speech characteristics in said audio track and in said sound utterance include phones.

19. The method of claim 15 wherein said sound utterance is similar to said audio track, and said modifying step includes the step of temporally warping said video sequence to align corresponding individual speech characteristics.

20. The method of claim 19 wherein said video sequence is temporally warped by removing one or more video frames from said sequence, and wherein the frames to be removed are selected in accordance with individual speech characteristics associated with the respective frames of the sequence.

21. The method of claim 15 wherein said modifying step comprises the steps of:

storing video image data for individual speech components that are identified in said soundtrack; and retrieving stored video image data in a sequence corresponding to the identified individual speech components in said utterance, to produce a new video presentation.

22. The method of claim 21 further including the step of smoothly fitting the retrieved video image data in said sequence corresponding to successive individual speech components in said utterance.

23. The method of claim 22 wherein said smooth fitting step comprises the process of morphing between successive sets of retrieved video image data.

24. The method of claim 22 further including the steps of analyzing images in said video sequence to define control information therein, storing said control information with the stored video image data, and smoothly fitting the video image data in accordance with the stored control information.

25. The method of claim 24 wherein said control information comprises points in the video images which relate to features in the images.

26. A system for modifying a recorded video image stream to synchronize it to a soundtrack which is generated separately from the recorded video image stream, comprising:

means for automatically analyzing the recorded video image stream to identify sequences of images that are associated with individual speech characteristics;

a memory storing a database containing said identified sequences of images;

means for automatically analyzing said soundtrack to identify individual speech characteristics contained therein; and means for selecting sequences of images contained in said database that correspond to individual speech characteristics that are identified in said soundtrack and assembling the selected sequences of images into a video image stream that is synchronized with said soundtrack.

27. The system of claim 26 wherein each of said automatic analyzing means comprises a speech recognition system.

28. The system of claim 27 wherein said speech recognition system is a Hidden Markov Model system.

29. The system of claim 27 wherein said speech recognition system is a neural network.

30. The system of claim 27 wherein said speech recognition system comprises a Hidden Markov Model system and a neural network.

31. The system of claim 26 wherein said individual speech characteristics include speech phones.

32. The system of claim 26 further including means for smoothly fitting said selected images to one another to produce said synchronized video image stream.

33. The system of claim 32 wherein said fitting means includes an image morphing system.

34. The system of claim 26 wherein said means for automatically analyzing the recorded video image stream includes means for defining control points in said images which relate to predetermined features, and means for analyzing said control points to recognize speech characteristics associated with said features.

35. A system for modifying a recorded video image stream to synchronize it to a soundtrack which is generated separately from the recorded video image stream, comprising:

means for analyzing the recorded video image stream to identify images that are associated with individual speech characteristics;

a memory storing a first database containing sub images, each of which comprises a predetermined portion of one of said identified images;

means for analyzing said identified images to define control features within the subimage portions of said images;

means for annotating said stored subimages with data relating to said defined control features;

a memory storing a second database containing full-frame images from said video image sequence, together with said defined control features;

means for analyzing said soundtrack to identify individual speech characteristics contained therein;

means for selecting subimages contained in said first database that correspond to individual speech characteristics that are identified in said sound track; and means for incorporating the selected subimages into full-frame images stored in said second database, in accordance with the defined control features, to form a video stream that is synchronized with said soundtrack.

36. The system of claim 35 wherein said incorporating means aligns the control features in said subimages with corresponding control features in the full frame images, and cross-fades the subimages into the full-frame images.

37. The system of claim 35 wherein said incorporating means comprises a morphing system which morphs the subimages into the full-frame images in accordance with said control features.

38. A method for synchronizing a video sequence having an accompanying audio track with a different audio track, comprising the steps of:

analyzing the audio track accompanying said video sequence to identify individual speech characteristics in said audio track;

analyzing a sound utterance in said different audio track by means of automatic speech recognition techniques to identify individual speech characteristics in said sound utterance; and reordering frames of said video sequence so that identified individual speech characteristics in said video sequence are temporally aligned with corresponding individual speech characteristics in said sound utterance.

39. A method for modifying a video recording that is associated with a first audio track to produce a video presentation corresponding to a second audio track, comprising the steps of:

analyzing said video recording to identify sequences of video frames that are associated with individual features in said first audio track, and storing said sequences of frames in a database in accordance with said identified features;

analyzing said second audio track to identify individual features therein;

selecting sequences of frames stored in said database according to the identified features in said second audio track, and assembling the selected sequences of frames to form a video stream that is synchronized to said second audio track.

* * * * *